(12) United States Patent
Mastro et al.

(10) Patent No.: US 12,092,028 B2
(45) Date of Patent: Sep. 17, 2024

(54) SCOOP ASSEMBLY FOR ROTATIONAL EQUIPMENT

(71) Applicant: Raytheon Technologies Corporation, Farmington, CT (US)

(72) Inventors: Jacob P. Mastro, Glastonbury, CT (US); Kyle L. Forgette, West Hartford, CT (US); Daniel K. DeVaux, Wethersfield, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/211,419

(22) Filed: Jun. 19, 2023

(65) Prior Publication Data

US 2023/0407790 A1 Dec. 21, 2023

Related U.S. Application Data

(60) Provisional application No. 63/353,344, filed on Jun. 17, 2022.

(51) Int. Cl.
*F02C 7/06* (2006.01)
*F01D 25/18* (2006.01)

(52) U.S. Cl.
CPC ............ *F02C 7/06* (2013.01); *F01D 25/18* (2013.01); *F05D 2260/98* (2013.01)

(58) Field of Classification Search
CPC .......... F02C 7/06; F01D 25/18; F01D 25/125; F05D 2260/98
See application file for complete search history.

(56) References Cited

U.S. PATENT DOCUMENTS

| | | | |
|---|---|---|---|
| 3,034,378 A | 5/1962 | Anderson | |
| 3,730,038 A | 5/1973 | Farb | |
| 4,648,485 A * | 3/1987 | Kovaleski | F16N 7/18 184/26 |
| 9,441,541 B2 * | 9/2016 | Wotzak | F16C 33/6674 |
| 10,612,415 B2 * | 4/2020 | Duong | F04D 29/545 |
| 11,286,854 B2 * | 3/2022 | Coffin | F02C 7/06 |

(Continued)

FOREIGN PATENT DOCUMENTS

EP 1936245 B1 5/2012

OTHER PUBLICATIONS

EP Search Report for EP Patent Application No. 23179896.8 dated Dec. 4, 2023.

*Primary Examiner* — Eldon T Brockman
(74) *Attorney, Agent, or Firm* — Getz Balich LLC

(57) ABSTRACT

An assembly for rotational equipment includes a scoop ring body and an insert. The scoop ring body is rotatable about a rotational axis. The scoop ring body extends radially between and inner radial side and an outer radial side. The scoop ring body includes a body material. The insert is mounted to the scoop ring body. The insert includes an insert material and a cutting edge. The insert material is different than the body material. The scoop ring body and the insert form a passage. The passage extends through the scoop ring body from an inlet at the outer radial side to an outlet at the inner radial side. The cutting edge is at the inlet. The passage extends within the scoop ring body between a first circumferential side and a second circumferential side. The passage at the first circumferential side is at least partially formed by the insert.

20 Claims, 8 Drawing Sheets

(56) References Cited

U.S. PATENT DOCUMENTS

| | | |
|---|---|---|
| 2013/0283758 A1 | 10/2013 | Wotzak |
| 2021/0040888 A1 | 2/2021 | Coffin |
| 2022/0049625 A1 | 2/2022 | Siw |

* cited by examiner

SCOOP ASSEMBLY FOR ROTATIONAL EQUIPMENT

This application claims priority to U.S. Patent Appln. No. 63/353,344 filed Jun. 17, 2022, which is hereby incorporated herein by reference in its entirety.

BACKGROUND

1. Technical Field

This disclosure relates generally to rotational equipment and, more particularly, to lubricant scoop assemblies for rotational equipment.

2. Background Information

Rotational equipment such as a gas turbine engine may include a radial scoop for collecting and distributing lubricant injected into a compartment from a nozzle. Various types and configurations of radial scoops are known in the art. While these known radial scoops have various advantages, there is still room in the art for improvement. There is a need in the art, therefore, for an improved radial scoop for rotational equipment.

SUMMARY

It should be understood that any or all of the features or embodiments described herein can be used or combined in any combination with each and every other feature or embodiment described herein unless expressly noted otherwise.

According to an aspect of the present disclosure, an assembly for rotational equipment includes a scoop ring body and an insert. The scoop ring body is rotatable about a rotational axis. The scoop ring body extends radially between and inner radial side and an outer radial side. The scoop ring body includes a body material. The insert is mounted to the scoop ring body. The insert includes an insert material and a cutting edge. The insert material is different than the body material. The scoop ring body and the insert form a passage. The passage extends through the scoop ring body from an inlet at the outer radial side to an outlet at the inner radial side. The cutting edge is at the inlet. The passage extends within the scoop ring body between a first circumferential side and a second circumferential side. The passage at the first circumferential side is at least partially formed by the insert.

In any of the aspects or embodiments described above and herein, the insert material may include tungsten carbide.

In any of the aspects or embodiments described above and herein, a first scoop of the assembly may include the insert and the passage and the first scoop may be one of a plurality of scoops of the assembly.

In any of the aspects or embodiments described above and herein, the plurality of scoops may be arranged in the scoop ring body about the rotational axis as a circumferential array of scoops.

In any of the aspects or embodiments described above and herein, the plurality of scoops may be axially arranged in the scoop ring body as an axial array of scoops.

In any of the aspects or embodiments described above and herein, the insert may form a first portion of the passage along the first circumferential side at the inlet and the scoop ring body may form a second portion of the passage along the first circumferential side between the first portion and the outlet.

In any of the aspects or embodiments described above and herein, the insert may form an entire longitudinal length of the passage along the first circumferential side.

In any of the aspects or embodiments described above and herein, the insert may include an inner surface and an outer surface. The inner surface may intersect the outer surface at the cutting edge. The passage at the first circumferential side may be at least partially formed by the inner surface. The inner surface may be curved.

In any of the aspects or embodiments described above and herein, the insert may welded or brazed to the scoop ring body.

In any of the aspects or embodiments described above and herein, the insert may include a leading end and a trailing end opposite the leading end. The cutting edge may be at the leading end. The insert may be welded or brazed to the scoop ring body at the trailing end.

In any of the aspects or embodiments described above and herein, the scoop ring body may include a recess on the outer radial side. The insert may include an alignment tab. The alignment tab may be located at the trailing end. The alignment tab may be positioned within the recess.

In any of the aspects or embodiments described above and herein, the scoop ring body may extend axially between a first axial end and a second axial end. The scoop ring body may include an axial slot extending through at least an axial portion of the scoop ring body between the first axial end and the second axial end. The insert may be positioned within the axial slot.

According to another aspect of the present disclosure, an assembly for rotational equipment includes an engine static structure, a rotatable base structure, a scoop ring, and a lubricant injector. The rotatable base structure is configured to rotate about a rotational axis relative to the engine static structure. The scoop ring is mounted to the rotatable base structure. The scoop ring is configured with a passage and includes a scoop ring body and an insert. The passage extends through the scoop ring from an inlet at an outer radial side of the scoop ring to an outlet at an inner radial side of the scoop ring. The passage is partially formed by the insert. The scoop ring body includes a body material. The insert material includes an insert material which is different than the body material. The lubricant injector is positioned radially outside of the scoop ring. The lubricant injector is configured to direct lubricant against the scoop ring at the outer radial side.

In any of the aspects or embodiments described above and herein, the rotatable base structure may include a shaft and a bearing. The bearing may be configured to rotatably support the shaft. The bearing may include an inner race fixedly mounted to the shaft. The scoop ring body may be mounted to and axially adjacent the inner race.

In any of the aspects or embodiments described above and herein, the insert includes may include a cutting edge. The insert may be positioned so that the cutting edge is configured to pass through the lubricant stream as the scoop ring body rotates about the rotational axis.

In any of the aspects or embodiments described above and herein, the insert material may include tungsten carbide.

In any of the aspects or embodiments described above and herein, a first scoop of the scoop ring may includes the insert and the passage and the first scoop may be one of a plurality of scoops of the scoop ring.

According to another aspect of the present disclosure, a method for directing lubricant to a rotatable base structure of a gas turbine engine includes directing a lubricant stream of the lubricant from a lubricant injector toward a scoop ring. The scoop ring includes a scoop ring body and an insert. The scoop ring body includes a body material. The insert includes an insert material. The insert material is different than the body material. The scoop ring includes a passage through the scoop ring body. The scoop ring body and the insert form the passage. The method further includes rotating the scoop ring such that a cutting edge of the insert passes through the lubricant stream and the insert directs at least some of the lubricant from the lubricant stream into the passage. The method further includes directing the lubricant through the passage to the rotatable base structure.

In any of the aspects or embodiments described above and herein, the passage may extend through the scoop ring body from an inlet to an outlet. The cutting edge may be positioned at the inlet.

In any of the aspects or embodiments described above and herein, directing the lubricant through the passage may include directing the lubricant along an inner surface of the insert through at least a portion of the passage.

The present disclosure, and all its aspects, embodiments and advantages associated therewith will become more readily apparent in view of the detailed description provided below, including the accompanying drawings.

DETAILED DESCRIPTION

Figure 1:
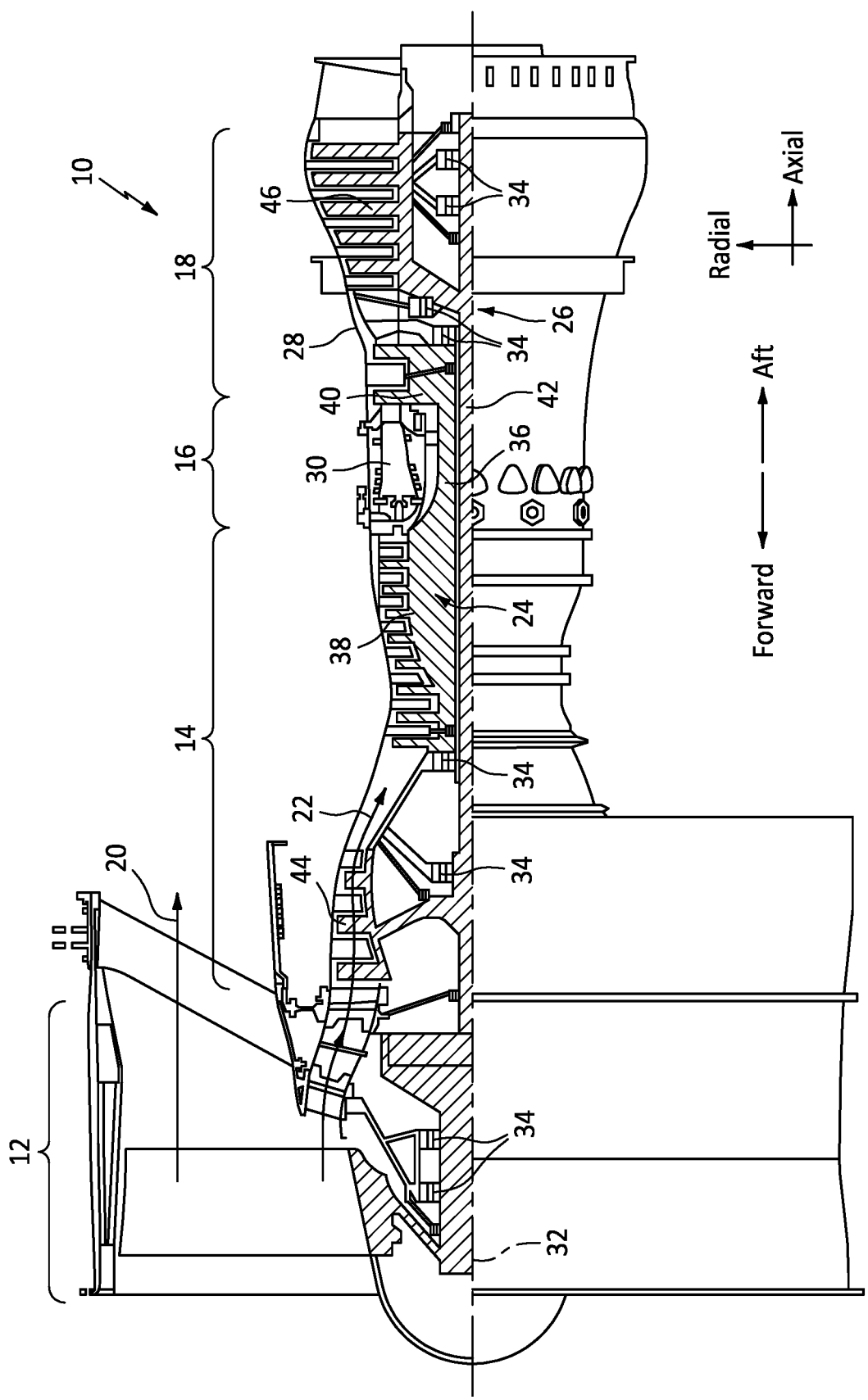
FIG. 1 illustrates a schematic cutaway of a gas turbine engine for an aircraft propulsion system, in accordance with one or more embodiments of the present disclosure.

FIG. 1 schematically illustrates a gas turbine engine 10. The gas turbine engine 10 of FIG. 1 is a multi-spool turbofan gas turbine engine for an aircraft propulsion system. However, while the following description and accompanying drawings may refer to the turbofan gas turbine engine of FIG. 1 as an example, it should be understood that aspects of the present disclosure may be equally applicable to other types of gas turbine engines including, but not limited to, a turboshaft gas turbine engine, a turboprop gas turbine engine, a turbojet gas turbine engine, a propfan gas turbine engine, or an open rotor gas turbine engine. The gas turbine engine of FIG. 1 includes a fan section 12, a compressor section 14, a combustor section 16, and a turbine section 18. The fan section 12 drives air along a bypass flow path 20 while the compressor section 14 drives air along a core flow path 22 for compression and communication into the combustor section 16 and then expansion through the turbine section 18.

The gas turbine engine 10 of FIG. 1 includes a first rotational assembly 24 (e.g., a high-pressure spool), a second rotational assembly 26 (e.g., a low-pressure spool), an engine static structure 28 (e.g., an engine case, a bearing compartment case, etc.), and an annular combustor 30. The first rotational assembly 24 and the second rotational assembly 26 are mounted for rotation about an axial centerline 32 (e.g., a rotational axis) of the gas turbine engine 10 relative to the engine static structure 28. The first rotational assembly 24 and the second rotational assembly 26 may be rotatably supported by one or more bearing systems 34. It should be understood that bearing systems, such as the bearing systems 34, may be provided at various additional or alternative locations of the gas turbine engine 10.

The first rotational assembly 24 includes a first shaft 36, a bladed first compressor rotor 38, and a bladed first turbine rotor 40. The first shaft 36 interconnects the bladed first compressor rotor 38 and the bladed first turbine rotor 40. The second rotational assembly 26 includes a second shaft 42, a bladed second compressor rotor 44, and a bladed second turbine rotor 46. The second shaft 42 interconnects the bladed second compressor rotor 44 and the bladed second turbine rotor 46. It should be understood that "low pressure" and "high pressure" or variations thereof as used herein are relative terms indicating that the high pressure is greater than the low pressure. The annular combustor 30 is disposed between the bladed first compressor rotor 38 and the bladed first turbine rotor 40 along the core flow path 22. In operation, airflow along the core flow path 22 is compressed by the bladed first compressor rotor 38 and the bladed second compressor rotor 44, mixed and burned with fuel in the combustor 30, and then expanded across the bladed first turbine rotor 40 and the bladed second turbine rotor 46. The bladed first turbine rotor 40 and the bladed second turbine rotor 46 rotationally drive the first rotational assembly 24 and the second rotational assembly 26, respectively, in response to the expansion of the combustion gases. The first shaft 36 and the second shaft 42 are concentric and rotate via the one or more bearing systems 34 about the axial centerline 32, which axial centerline 32 is collinear with respective rotational axes of the first shaft 36 and the second shaft 42.

Figure 2:
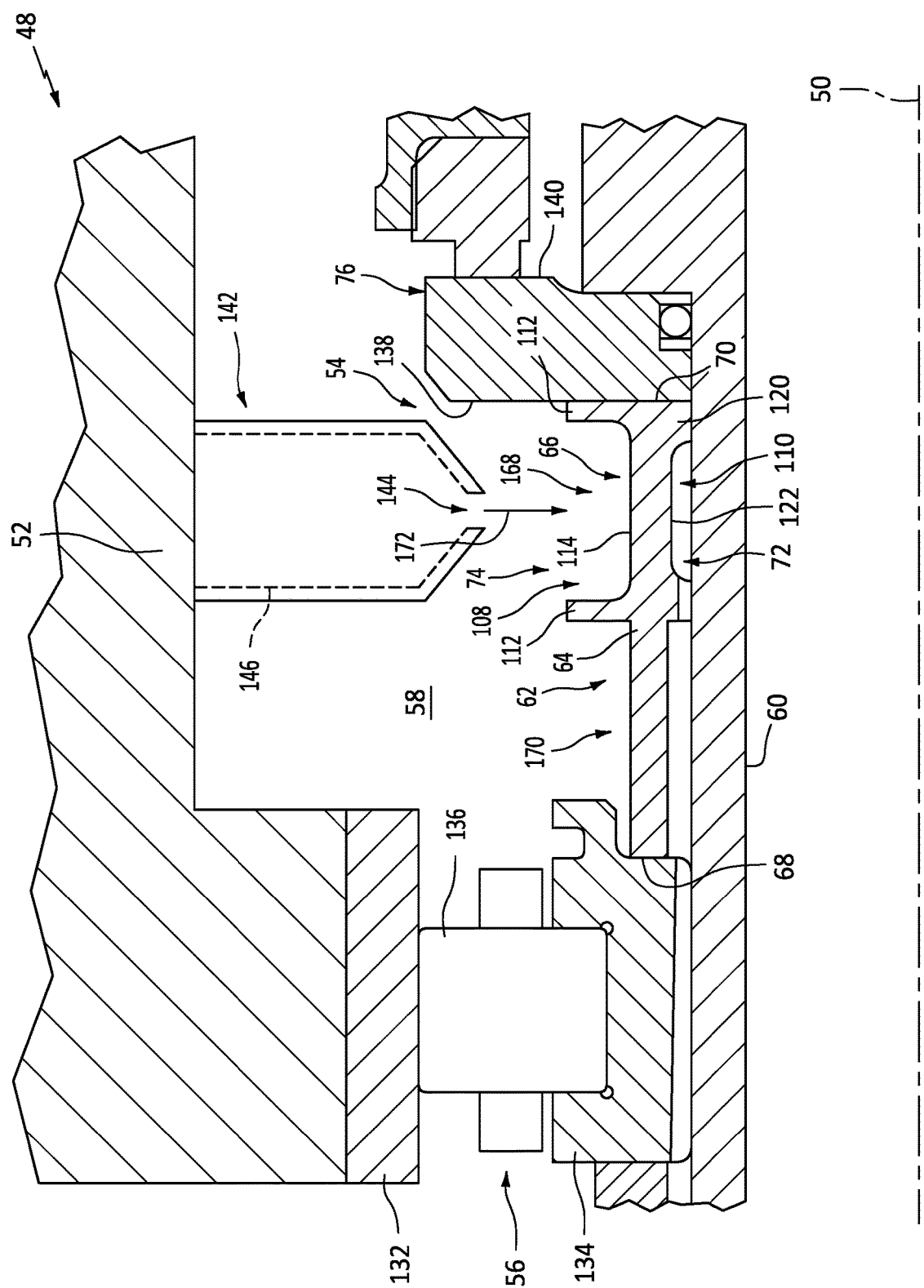
FIG. 2 illustrates a partial side sectional view of an assembly for the gas turbine engine including a scoop ring, in accordance with one or more embodiments of the present disclosure.

FIG. 2 illustrates an assembly 48 for rotational equipment with an axial centerline 50. The axial centerline 50 may also be an axis of rotation (e.g., a rotational axis) for one or more components of the rotational equipment assembly 48. An example of such rotational equipment includes the first rotational assembly 24, the second rotational assembly 26, and/or the bearing systems 34 of the gas turbine engine 10 FIG. 1. However, the rotational equipment assembly 48 is not limited to use with aircraft or gas turbine engine (e.g., the gas turbine engine 10) applications. The rotational equipment assembly 48 may alternatively be configured with rotational equipment such as an industrial gas turbine engine, a wind turbine, a water turbine, or any other apparatus in which fluid may be collected and/or distributed by a rotating scoop.

The rotational equipment assembly 48 of FIG. 2 includes a static structure 52 (e.g., the engine static structure 28 of FIG. 1), a rotatable subassembly 54, and at least one bearing 56 (e.g., a bearing of the one or more bearings systems 34 of FIG. 1) for rotatably supporting the rotatable subassembly 54 relative to the static structure 52. The rotational equipment assembly 48 of FIG. 2 further includes at least one fluid injector 142 such as a lubricant injector, a lubricant nozzle, etc.

The static structure 52 is configured as a stationary part of the rotational equipment. The static structure 52 of FIG. 2, for example, is configured to at least partially form an internal bearing compartment 58 for housing the at least one bearing 56. The static structure 52 may be formed by a case (e.g., an engine case), a frame (e.g., a mid-turbine frame), or other fixed structural body of the associated rotational equipment.

The rotatable subassembly 54 of FIG. 2 includes a rotatable base structure 60 and a scoop ring 62. The rotatable subassembly 54 may include one or more additional rotatable bodies, such as the rotatable body 76 of FIG. 2. The rotatable subassembly 54 and its components 60, 62, 76 are each configured to rotate about a common rotational axis which, in the embodiment of FIG. 2, is the axial centerline 50.

The rotatable base structure 60 of FIG. 2 is configured as a tubular shaft. However, in other embodiments, the rotatable base structure 60 may be configured as another component (e.g., a sleeve) mounted to and rotatable with a shaft of the rotational equipment, or any other rotor within the rotational equipment. The rotatable base structure 60 of FIG. 2 extends axially along the axial centerline 50 through (or partially into or within) the static structure 52. The static structure 52 of FIG. 2 may, therefore, extend circumferentially about (e.g., completely around) the axial centerline 50 and the rotatable subassembly 54.

Referring to FIGS. 2-5, the scoop ring 62 is configured as a scoop element (e.g., a radial scoop). The scoop ring 62 includes a scoop ring body 64 and one or more scoops 66. The scoop ring body 64 is configured as a tubular body with an inner bore configured to receive the rotatable base structure 60. The scoop ring body 64 extends axially along the axial centerline 50 between and to a first axial end 68 of the scoop ring body 64 and a second axial end 70 of the scoop ring body. The scoop ring body 64 extends circumferentially about (e.g., completely around) the axial centerline 50. The scoop ring body 64 extends radially between and to an inner radial side 72 of the scoop ring body 64 and an outer radial side 74 of the scoop ring body 64.

The scoop ring body 64 may include a scoop portion 168 and a spacer portion 170. The scoop portion 168 may include the one or more scoops 66. The scoop portion 168 of FIG. 2 is positioned at (e.g., on, adjacent, or proximate) the second axial end 70. The spacer portion 170 may be located axially adjacent the scoop portion 168. The spacer portion 170 of FIG. 2 extends from the first axial end 68 to the scoop portion 168. The spacer portion 170 may additionally or alternatively be located between the second axial end 70 and the scoop portion 168. The scoop ring body 64 may be configured as an intermediate element for locating two other axially adjoining elements (e.g., the bearing 56 and the rotatable body 76). The scoop ring body 64, for example, may also be configured as a shaft spaced, a runner, a sleeve, etc.

The scoop ring body 64 includes a body material. The body material may form all or a substantial portion of the scoop ring body 64. The body material may be metal such as alloy steel, however, the present disclosure is not limited to the use of metal or alloy steel for the body material.

Each scoop 66 includes an insert 78 and a passage 80 (e.g., a lubricant passage). The scoop 66 may additionally include an outer channel 108 (e.g., an inlet/capture channel), an inner channel 110 (e.g., an outlet/supply channel), and/or a dam 104 (e.g., a lubricant dam).

The insert 78 is mounted to the scoop ring body 64. The insert 78 extends between and to a leading end 82 of the insert 78 and a trailing end 84 of the insert 78. The insert 78 further extends between and to a first side 86 of the insert 78 and a second side 88 of the insert 78. The first side 86 and the second side 88 may extend from the leading end 82 to the trailing end 84. The insert 78 includes an edge 90 (e.g., a cutting edge), an inner surface 92, and an outer surface 94. The edge 90 is located at the leading end 82. The edge 90 is formed by an intersection of the inner surface 92 and the outer surface 94. The inner surface 92, the outer surface 94, and the edge 90 may extend from the first side 86 to the second side 88. Examples of mounting configurations for mounting the insert 78 to the scoop ring body 64 include one or more weld joints, braze joints, and/or fasteners, as well as slotted engagement between the insert 78 and the scoop ring body 64. The present disclosure, however, is not limited to any particular technique for mounting the insert 78 to the scoop ring body 64.

The insert 78 includes an insert material. The insert material may form all or a substantial portion of the insert 78. The insert material may be different than the body material. For example, the insert material may be harder than the body material. The hardness of the body material and the insert material, as described herein, may be understood to represent a measure of resistance of the respective material to localized plastic deformation (e.g., as measured using the Vickers hardness scale, the Mohs scale, etc.). Examples of the insert material may include, but are not limited to, carbides such as tungsten carbide, titanium carbide, boron carbide, and silicon carbide, titanium, cobalt-based alloys, and ceramic materials. The present disclosure, however, is not limited to any particular material for the insert material. Furthermore, it is contemplated the insert material may be the same as the body material where, for example, the insert 78 is configured as a replaceable wear item.

Figure 3:
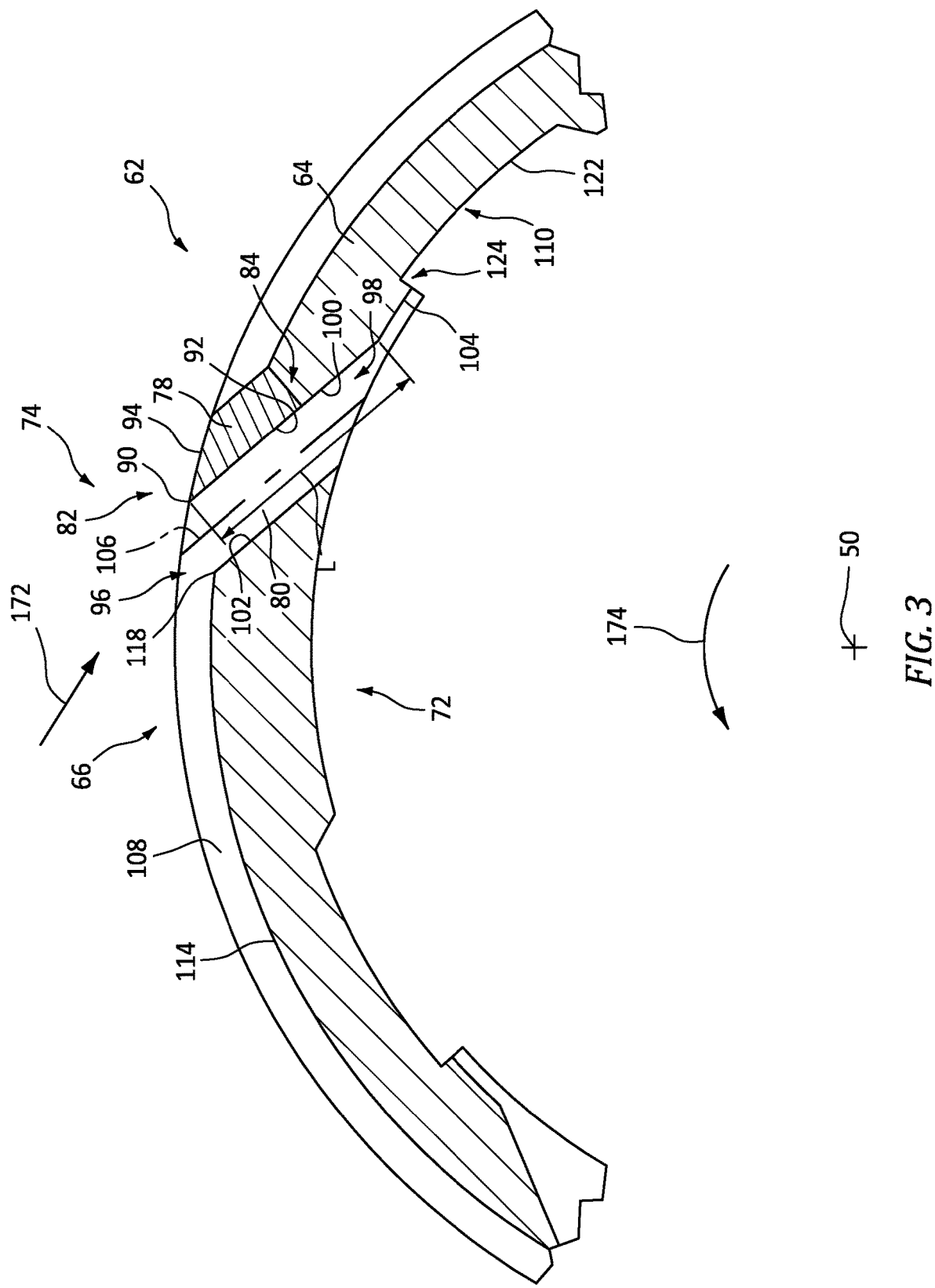
FIG. 3 illustrates a cross-sectional view of a portion of the scoop ring of FIG. 2, in accordance with one or more embodiments of the present disclosure.

The scoop ring body 64 and the insert 78 form the passage 80. The passage 80 extends through the scoop ring body 64 from an inlet 96 of the passage 80 at (e.g., on, adjacent, or proximate) the outer radial side 74 to an outlet 98 of the passage 80 at (e.g., on, adjacent, or proximate) the inner radial side 72. The passage 80 extends longitudinally along longitudinal passage centerline 106 from the inlet 96 to the outlet 98. The passage 80 extends circumferentially within the scoop ring body 64 between a first circumferential side 100 and a second circumferential side 102 which is circumferentially opposite the first circumferential side 100. The first circumferential side 100 has a longitudinal length L which extends from the inlet 96 to the outlet 98. The edge 90 of the insert 78 of FIG. 3 is positioned at (e.g., on, adjacent, or proximate) the inlet 96 on the first circumferential side 100. The edge 90 may, therefore, form a portion of the inlet 96. The passage 80 at the first circumferential side 100 may be at least partially formed by the insert 78 (e.g., by the inner surface 92). For example, the passage 80 of FIG. 3 is formed by the scoop ring body 64 and the insert 78 along the longitudinal length L of the first circumferential side 100.

The longitudinal passage centerline 106 may have a radial component (e.g., a non-zero radial component) and a circumferential component (e.g., a non-zero circumferential component). The longitudinal passage centerline 106 and, thus, the passage 80 may thereby extend obliquely (e.g., diagonally) through the scoop ring body 64. The longitudinal passage centerline 106 may lie on a reference plane, which plane may be perpendicular to the axial centerline 50. In other embodiments, however, the longitudinal passage centerline 106 may also have an axial component (e.g., a non-zero axial component). The longitudinal passage centerline 106 may extend in a circumferential direction, from the inlet 96 to the outlet 98, opposite to a direction of rotation of the rotatable subassembly 54. However, the present disclosure is not limited to the longitudinal passage centerline 106 extending a circumferential direction opposite to a direction of rotation of the rotatable subassembly 54.

The outer channel 108 is formed, at least in part, by the scoop ring body 64. The outer channel 108 is positioned circumferentially upstream of the passage 80 on the outer radial side 74. The outer channel 108 may extend axially between opposing axial channel sidewalls 112 formed by the scoop ring body 64. The outer channel 108 may extend radially (e.g., in an inward direction toward the axial centerline 50) partially into the scoop ring body 64 to a radial channel boundary 114. The outer channel 108 may extend circumferentially within the scoop ring body 64 from an upstream channel end 116 of the outer channel 108 to a downstream channel end 118 of the outer channel 108. The outer channel 108 is fluidly coupled with and upstream of the passage 80. For example, the downstream channel end 118 of FIG. 3 is located at (e.g., on, adjacent, or proximate) the inlet 96. The outer channel 108 may thereby extend circumferentially within the scoop ring body 64 to the passage 80. The present disclosure, however, is not limited to such an exemplary direct fluid coupling.

The inner channel 110 is formed by the scoop ring body 64. The inner channel 110 is positioned circumferentially downstream of the passage 80 on the inner radial side 72. The inner channel 110 of FIG. 2 extends axially in a direction from the first axial end 68 to an axial channel sidewall 120 at (e.g., on, adjacent, or proximate) the second axial end 70. However, in some embodiments, the inner channel 110 may alternatively extend axially through the second axial end 70. The inner channel 110 of FIG. 4 may extend radially (e.g., in an outward direction away from the axial centerline 50) partially into the scoop ring body 64 to a radial channel boundary 122. The inner channel 110 of FIG. 4 may extend circumferentially within the scoop ring body 64 from an upstream channel end 124 of the inner channel 110 to a downstream channel end 126 of the inner channel 110. The inner channel 110 is downstream of the passage 80. For example, the upstream channel end 124 of FIG. 3 is located downstream of the outlet 98. The inner channel 110 may thereby extend circumferentially within the scoop ring body 64 in a direction away from the passage 80. The present disclosure, however, is not limited to the location of the upstream channel end 124 downstream of the outlet 98.

The dam 104 may be located at (e.g., on, adjacent, or proximate) the outlet 98. The dam 104 may be located downstream of the outlet 98. The dam 104 may be located upstream of the inner channel 110. For example, the dam 104 of FIG. 3 is located circumferentially between the outlet 98 and the inner channel 110. The dam 104 of FIG. 3 is formed by the scoop ring body 64. The dam 104 may project radially inward relative to circumferentially adjacent portions of the scoop 66 (e.g., the outlet 98 and/or the inner channel 110). In operation of the rotational equipment assembly, at least some of the fluid directed through the passage 80 may flow across the dam 104 or between the dam 104 and the rotatable body 76, for example, in a clockwise direction for the scoop 66 of FIG. 3. The radially inward projection of the dam 104 may prevent or substantially reduce the occurrence of lubricant flow in a direction (e.g., a counterclockwise direction for the scoop 66 of FIG. 3) which may otherwise cause some of the lubricant to flow from the inner channel 110 and into the passage 80 (e.g., into the outlet 98).

Figure 4:
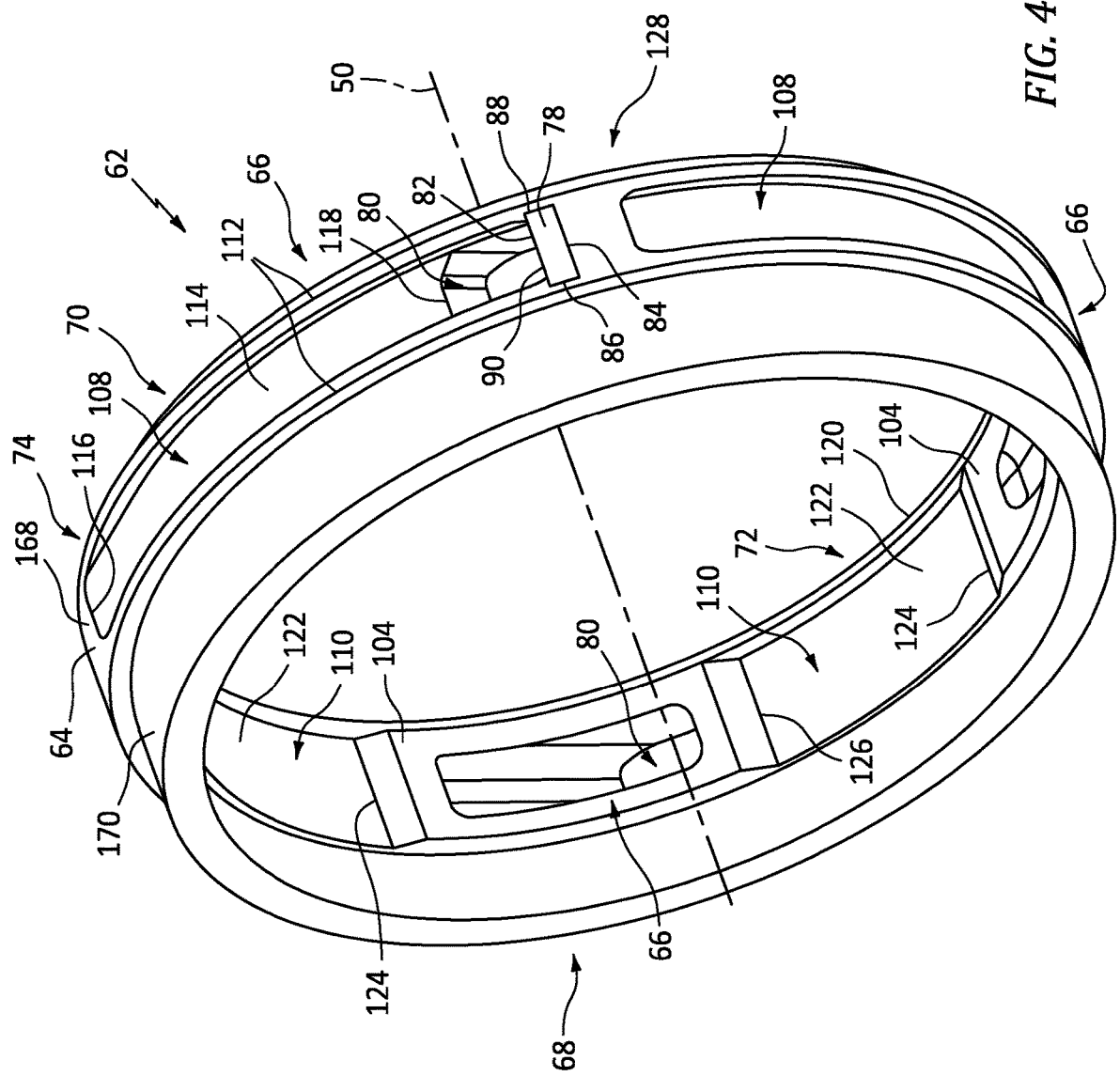
FIG. 4 illustrates a perspective view of the scoop ring of FIG. 2, in accordance with one or more embodiments of the present disclosure.

Each of the scoops 66 of the scoop ring 62 may be substantially identical to one another. The scoops 66 of FIG. 4 are arranged on the scoop ring body 64 about the axial centerline 50 as a circumferential array 128 of the scoops 66. The circumferential array 128 of FIG. 4 includes three scoops 66, however, the present disclosure is not limited to any particular number of scoops 66 for the circumferential array 128.

Figure 5:
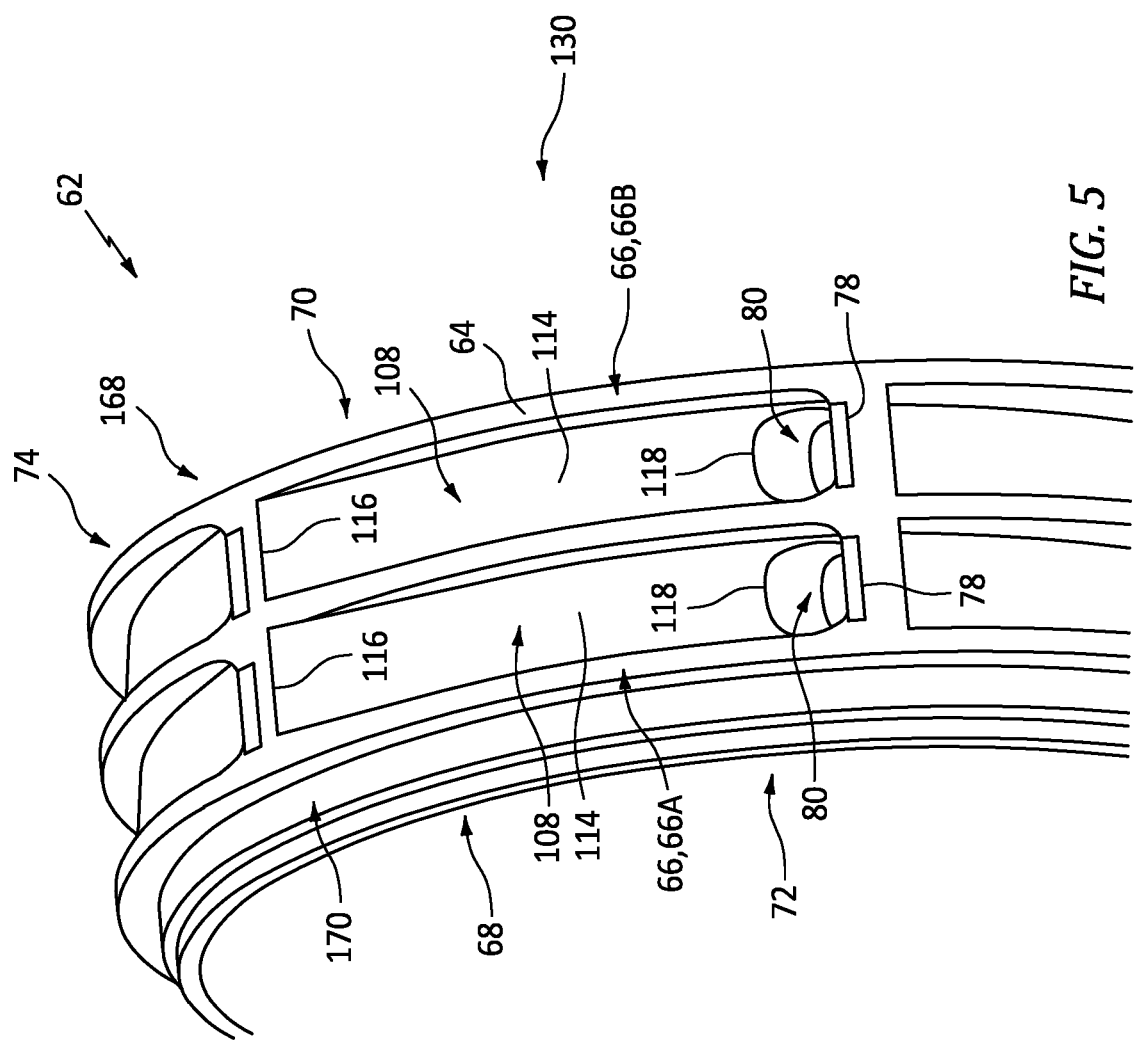
FIG. 5 illustrates a perspective view of a portion of another scoop ring, in accordance with one or more embodiments of the present disclosure.

The scoops 66 may be arranged on the scoop ring body 64 as an axial array 130 of the scoops 66. For example, the axial array 130 of FIG. 5 includes a first scoop 66A positioned axially adjacent a second scoop 66B on the scoop ring 62. The first scoop 66A and the second scoop 66B of FIG. 5 are substantially circumferentially aligned. The present disclosure, however, is not limited to such circumferential alignment between axially adjacent scoops, such as the scoops 66A, 66B.

The bearing 56 may be configured as a roller element bearing. The bearing 56 of FIG. 2, for example, includes an annular outer race 132, an annular inner race 134, and a plurality of bearing elements 136 (e.g., cylindrical or spherical elements). The outer race 132 circumscribes the inner race 134 and the bearing elements 136. The outer race 132 is mounted to the static structure 52. The inner race 134 circumscribes and is mounted to the rotatable base structure 60. The bearing elements 136 are arranged in an annular array about the axial centerline 50, which array is radially between and engaged with (e.g., contacts) the outer race 132 and the inner race 134. The present disclosure, however, is not limited to the foregoing exemplary bearing configuration. For example, in some other embodiments, the bearing 56 may alternatively be configured as a journal bearing or any other type of bearing which may be used in the rotational equipment.

The rotatable body 76 of FIG. 2 may be configured as another scoop element (e.g., an axial scoop). The rotatable body 76 may also or alternatively be configured as a seal land for a seal assembly. The rotatable body 76 is configured as a tubular body with an inner bore configured to receive the rotatable base structure 60. The rotatable body 76 of FIG. 2, for example, extends circumferentially about (e.g., completely around) the axial centerline 50. The rotatable body 76 extends axially along the axial centerline 50 between and to a first axial end 138 of the rotatable body 76 and a second axial end 140 of the rotatable body 76. The first axial end 138 may be mounted to and/or positioned axially adjacent the second axial end 70.

The fluid injector 142 is arranged radially outboard of the rotatable subassembly 54. The fluid injector 142 is configured to inject fluid (e.g., lubricant) into the bearing compartment 58 to provide the fluid to one or more other components of the rotational equipment such as, but not limited to, one or more or each of the assembly elements 56, 60, 62, and/or 76. The fluid injector 142 includes one or more nozzle orifices 144 (one visible in FIG. 2). The nozzle orifices 144 may be fluidly coupled with and, thus, supplied with the fluid (e.g., lubricant) from a common internal passage 146 within the fluid injector 142. The nozzle orifices 144 are configured to direct a fluid stream (e.g., a lubricant stream) out of the fluid injector 142, into the bearing compartment 58 or another space, and to the scoop ring 62. The nozzle orifices 144 may be further configured to direct the fluid stream to one or more other components within the bearing compartment 58 such as, but not limited to, the bearing 56 and the components 60, 62, 76 of the rotatable subassembly 54.

The rotational equipment assembly 48 operates to direct fluid (e.g., lubricant) to components of the rotatable subassembly 54, for example, to provide lubrication and/or cooling for the components. The fluid injector 142 directs a fluid steam 172 (e.g., a lubricant stream) of the fluid toward the scoop ring 62. As the scoop ring 62 rotates with the rotatable base structure (e.g., in rotational direction 174), the edge 90 of the insert 78 passes through the fluid stream 172. The insert 78 directs at least some of the fluid of the fluid stream 172 into and through the passage 80. The insert 78 may direct at least some of the fluid along the inner surface 92 through at least a portion of the passage 80. Rotation of the scoop ring 62 causes the scoop ring 62 to direct the fluid through the passage 80 to the rotating base structure 60 and, in some cases, to one or more additional components of the rotational equipment assembly 48.

Under certain operating conditions of rotational equipment, relatively high rotational speeds as well as relatively high fluid (e.g., lubricant) velocities from associated fluid injectors can expose radial scoop assemblies to substantial wear and fatigue. For example, a portion of a scoop assembly including an edge (e.g., a cutting edge configured to pass through a fluid stream) may experience damage such as plastic deformation and/or erosion of the cutting edge. Damage to the cutting edge of scoop assembly can, in turn, lead to reduced efficiency of the scoop assembly for directing fluid to components of the rotational equipment. Damage to the cutting edge can also lead to increased resistance of rotation of the scoop assembly presented by the fluid directed toward the scoop assembly. In some cases, scoop assemblies may be replaced to address cutting edge erosion. Coatings (e.g., plasma-spray coatings) may be applied to scoop assembly surfaces to protect the scoop assembly surfaces from fluid erosion. However, scoop assembly coatings can be subject to substrate material failure and coating liberation. Liberated pieces of coating material can travel with the fluid (e.g., lubricant) and can potentially obstruct fluid flow passages (e.g., lubricant feed ports). In some cases, liberated coating material can lead to bearing damage (e.g., by contamination or spallation of the bearing). Each scoop 66 of the present disclosure, therefore, is configured with the replaceable insert 78 to form the edge 90. As described above, the insert 78 is formed from relatively hard material which is less susceptible to damage such as plastic deformation and/or erosion. The insert 78 of the present disclosure, therefore, may maintain its shape without requiring protective coatings. The insert 78 may thereby improve efficiency of the rotational equipment assembly and reducing maintenance requirements.

Figure 6:
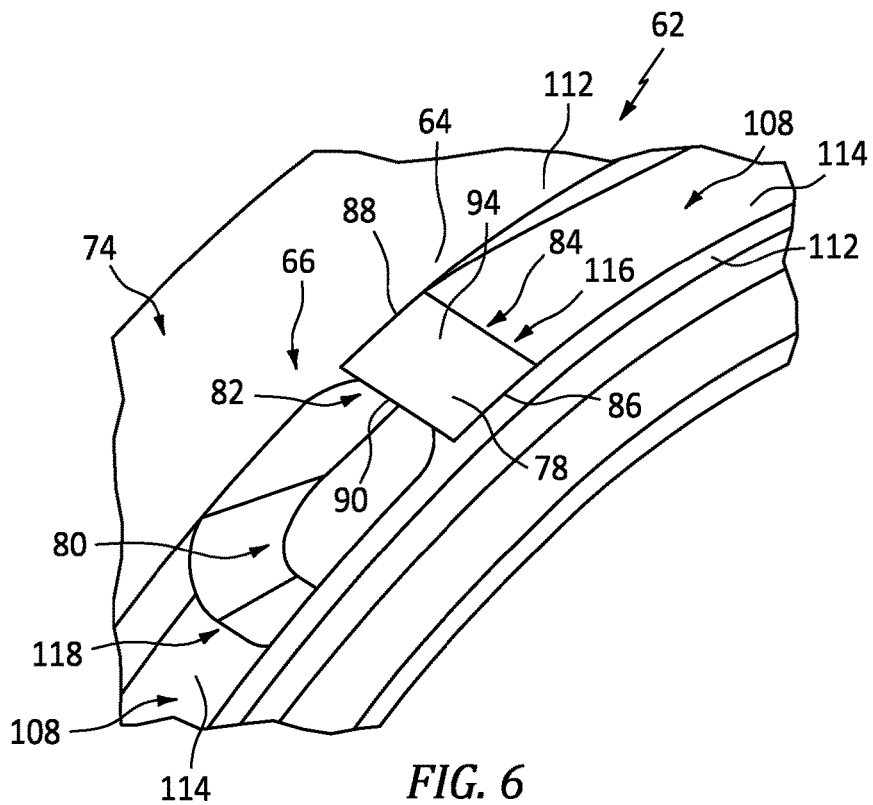
FIG. 6 illustrates a perspective view of a portion of another scoop ring, in accordance with one or more embodiments of the present disclosure.
Figure 7:
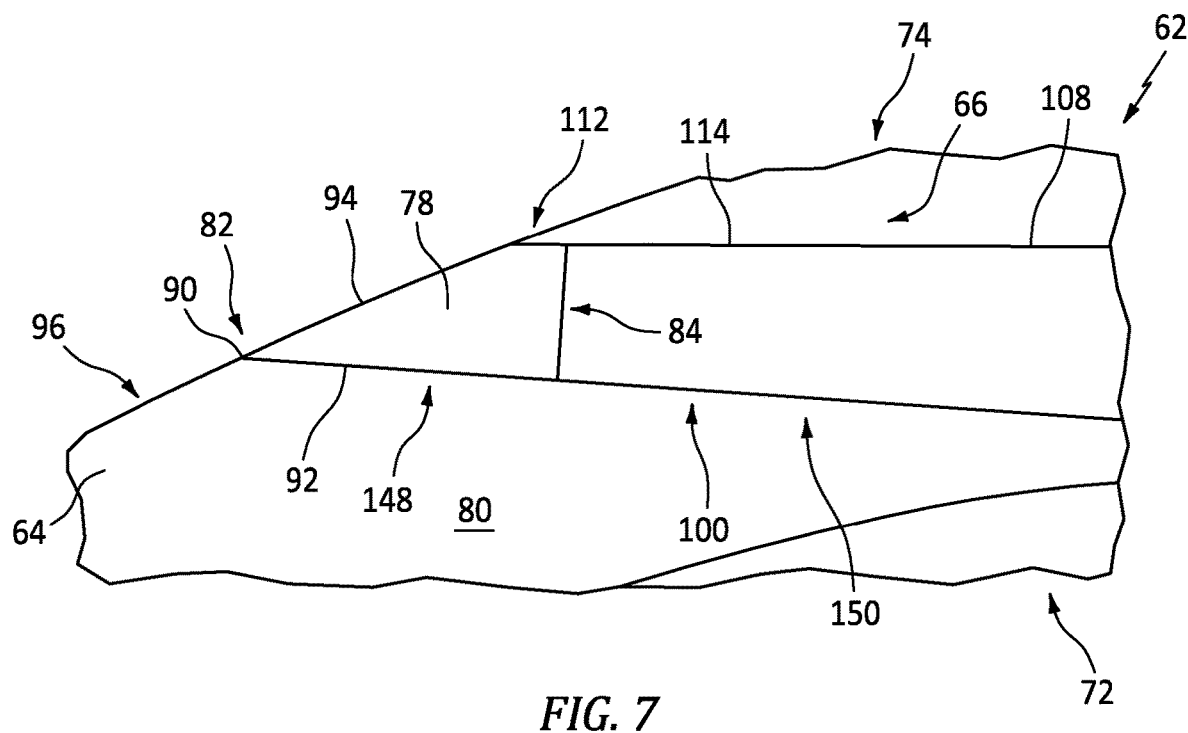
FIG. 7 illustrates a cutaway side view of a portion of the scoop ring of FIG. 6, in accordance with one or more embodiments of the present disclosure.

In some embodiments, referring to FIGS. 6 and 7, the insert 78 (e.g., and its inner surface 92) may form a first portion 148 of the passage 80 (e.g., a first portion of the longitudinal length L, see FIG. 3) along the first circumferential side 100 at (e.g., on, adjacent, or proximate) the inlet 96. The scoop ring body 64 may form a second portion 150 of the passage 80 (e.g., a second portion of the longitudinal length L, see FIG. 3) along the first circumferential side 100 between and to the first portion 148 and the outlet 98. The insert 78 of FIGS. 6 and 7 also forms a portion of the outer channel 108 of a circumferentially adjacent scoop 66. For example, the insert 78 may form a portion of the radial channel boundary 114 of a circumferentially adjacent scoop 66 at (e.g., on, adjacent, or proximate) the upstream channel end 116.

Figure 8:
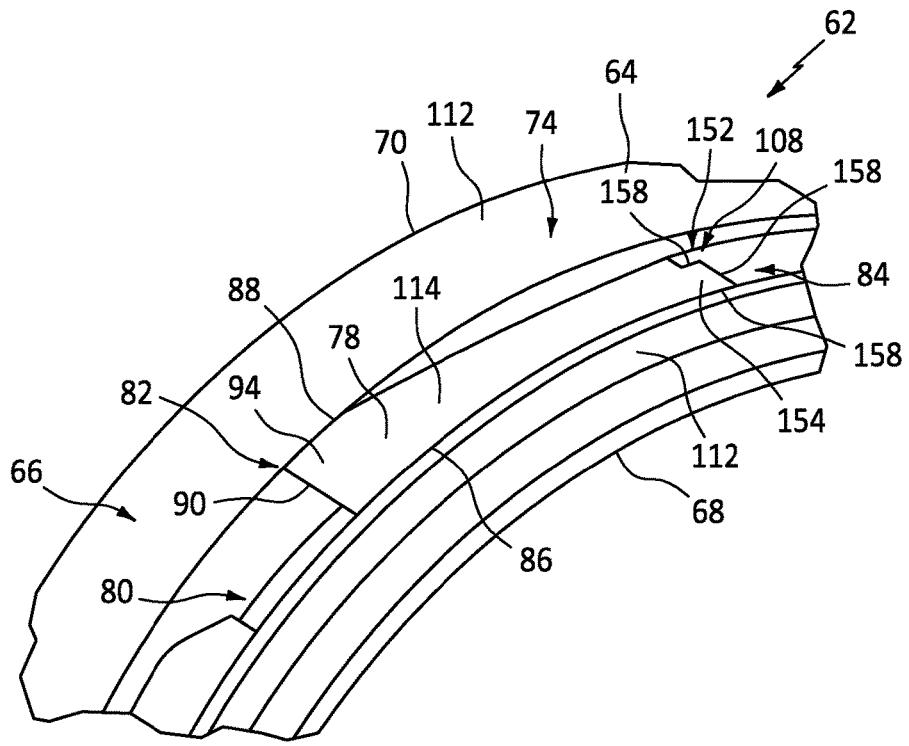
FIG. 8 illustrates a perspective view of a portion of another scoop ring, in accordance with one or more embodiments of the present disclosure.
Figure 9:
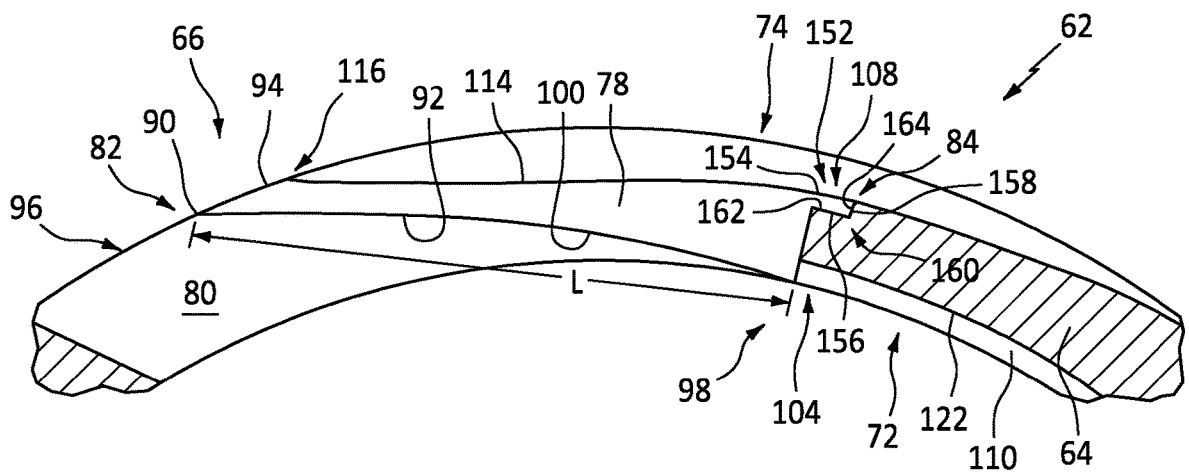
FIG. 9 illustrates a cutaway side view of a portion of the scoop ring of FIG. 8, in accordance with one or more embodiments of the present disclosure.

In some embodiments, referring to FIGS. 8 and 9, the insert 78 (e.g., and its inner surface 92) may form an entirety of the longitudinal length L of the passage 80 along the first circumferential side 100. In other words, the inner surface 92 may extend from the inlet 96 to the outlet 98. The insert 78 of FIGS. 8 and 9 also forms a portion of the outer channel 108 of a circumferentially adjacent scoop 66. For example, the outer surface 94 and/or another surface of the insert 78 may form a portion of the radial channel boundary 114 of a circumferentially adjacent scoop 66 at (e.g., on, adjacent, or proximate) the upstream channel end 116. The insert 78 of FIGS. 8 and 9 may also or alternatively form the dam 104. For example, the insert 78 forms the dam 104 at the trailing end 84 (e.g., at an intersection of the inner surface 92 and the trailing end 84). The dam 104 of FIGS. 8 and 9 projects inward (e.g., radially inward) from the radial channel boundary 122 of a circumferentially adjacent scoop 66.

In some embodiments, referring to FIGS. 8 and 9, the insert 78 may be shaped to facilitate efficient flow of fluid (e.g., lubricant) across one or more surfaces of the insert 78. One or more surfaces of the insert 78, such as the inner surface 92 and/or the outer surface 94, may be curved. For example, the inner surface 92 of FIG. 9 has a concave shape extending in a direction from the leading end 82 to the trailing end 84. The insert 78 of the present disclosure, however, is not limited to the particular curvature illustrated in FIG. 9. In some embodiments, the increased hardness of the insert material (e.g., in comparison to the body material) may allow the insert 78 to be formed with complex curvatures or other shapes to facilitate efficient fluid flow across one or more surfaces of the insert 78 while also resisting erosion of the insert material as a result of said fluid flow.

In some embodiments, referring to FIGS. 8 and 9, the insert 78 may include an alignment tab 152. This alignment tab 152 is disposed at (e.g., on, adjacent, or proximate) an intersection of the outer surface 94 and the trailing end 84. The alignment tab 152 of FIGS. 8 and 9 includes an upper surface 154, a lower surface 156, and one or more side surfaces 158. The side surfaces 158 extend between and to the upper surface 154 and the lower surface 156. The scoop ring body 64 forms a recess 160 within which the scoop ring body 64 is configured to retain the alignment tab 152. The recess 160 of FIGS. 8 and 9 is formed in the radial channel boundary 114 of a scoop 66 which is circumferentially adjacent the scoop 66 which includes the insert 78. For example, the scoop ring body 64 includes a bottom surface 162 and one or more side surfaces 164. The bottom surface 162 is spaced from (e.g., radially spaced from) the radial channel boundary 114. The side surfaces 164 extend between and to the bottom surface 162 and the radial channel boundary 114. The bottom surface 162 and the side surfaces 164 bound, at least in part, the recess 160. The recess 160 of the present disclosure, however, is not limited to particular location or configuration illustrated in FIGS. 8 and 9.

With the insert 78 installed in the scoop ring body 64, the lower surface 156 may abut the bottom surface 162 and the side surfaces 158 may abut the side surfaces 164. With the alignment tab 152 installed in the recess 160, the upper surface 154 may also form a portion of the radial channel boundary 114 of another circumferentially adjacent scoop 66. The alignment tab 152 and recess 160 may facilitate installation (e.g., mistake-proof installation) of the insert 78 into the scoop ring body 64 by allowing retention of the alignment tab 152 in the recess 160 (e.g., only) when the insert 78 is properly positioned with respect to the scoop ring body 64. Contact between the lower surface 156 and the bottom surface 162 may also facilitate proper spacing (e.g., radial spacing) of the dam 104 relative to the radial channel boundary 122.

In some embodiments, the insert 78 may be mounted to the scoop ring body 64 at (e.g., on, adjacent, or proximate) the alignment tab 152. For example, the alignment tab 152 may be mounted (e.g., directly coupled) to the scoop ring body 64, for example, by a weld joint, a braze joint, a fastener, or the like.

Figure 10:
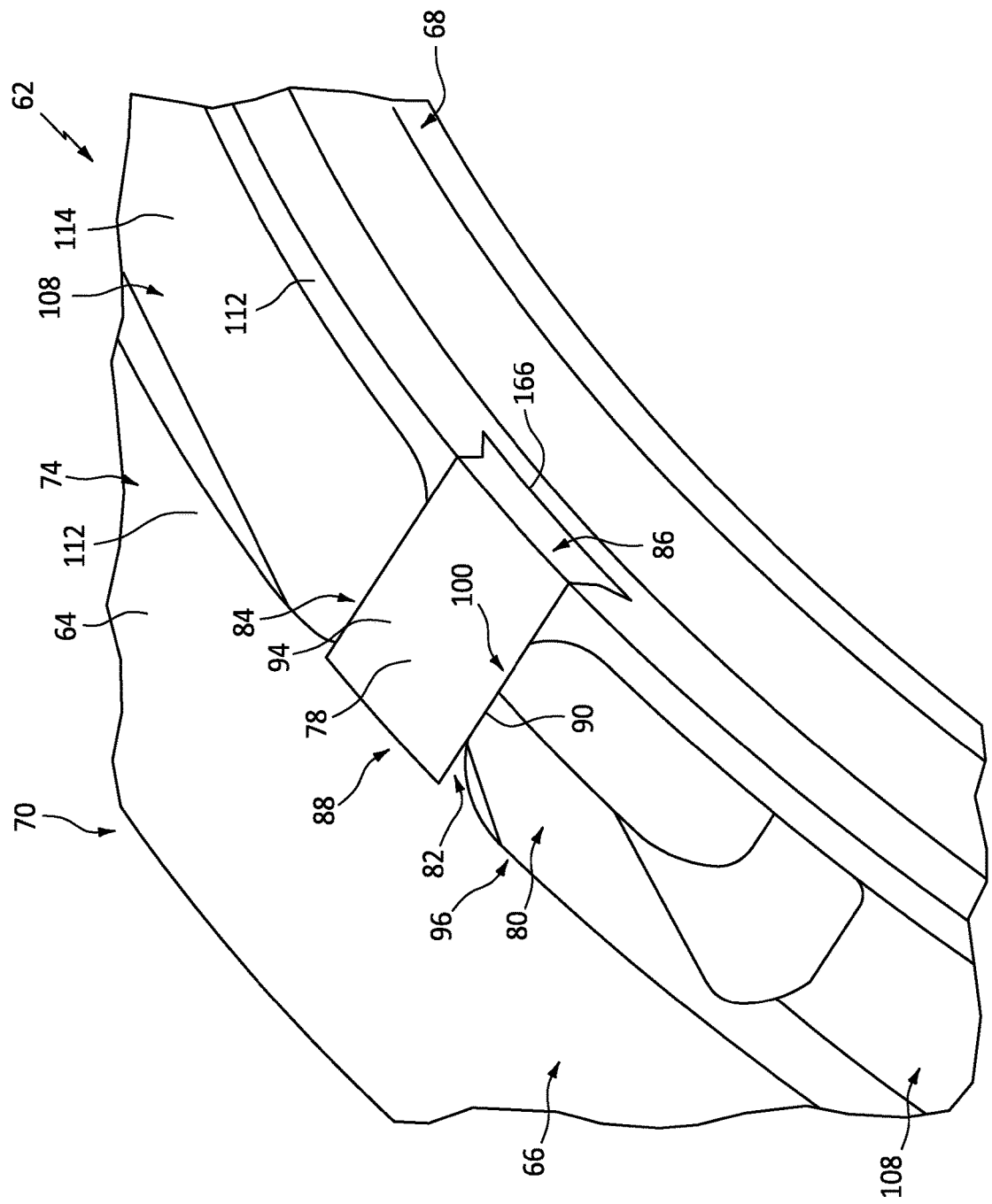
FIG. 10 illustrates a perspective view of a portion of another scoop ring, in accordance with one or more embodiments of the present disclosure.

In some embodiments, referring to FIG. 10, the scoop ring body 64 may form an axial slot 166. The axial slot 166 extends into at least an axial portion of the scoop ring body 64, where the axial slot 166 is disposed between the first axial end 68 and the second axial end 70. The axial slot 166 of FIG. 10 extends into the scoop ring body 64 in an axial direction from the first axial end 68 toward the second axial end 70. Of course, the axial slot 166 may alternatively extend into the scoop ring body 64 in an axial direction from the second axial end 70 toward the first axial end 68.

The insert 78 is mated with and securely positioned within the axial slot 166 such that the edge 90 is positioned at (e.g., on, adjacent, or proximate) the inlet 96 along the first circumferential side 100. The insert 78 may be configured to slide axially into the axial slot 166 for mounting. For example, the insert 78 may be configured to slide axially into the axial slot 166 from a first axial position outside the scoop ring body 64 to a second axial position in which the edge 90 is positioned at (e.g., on, adjacent, or proximate) the inlet 96 along the first circumferential side 100. The insert 78 of FIG. 10 forms a portion of one of the axial channel sidewalls 112, which portion is located within the axial slot 166. The insert 78 may additionally be mounted to the scoop ring body 64 by, for example, one or more weld joints, braze joints, and/or fasteners.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

What is claimed is:

1. An assembly for rotational equipment, the assembly comprising:
   a scoop ring body rotatable about a rotational axis, the scoop ring body extending radially between an inner radial side and an outer radial side, and the scoop ring body comprising a body material; and
   an insert mounted to the scoop ring body, the insert comprising an insert material and a cutting edge, and the insert material different than the body material;
   the scoop ring body and the insert forming a passage, the passage extending through the scoop ring body from an inlet at the outer radial side to an outlet at the inner radial side, the cutting edge at the inlet, the passage extending within the scoop ring body between a first circumferential side and a second circumferential side, and the passage at the first circumferential side at least partially formed by the insert.

2. The assembly of claim 1, wherein the insert material comprises tungsten carbide.

3. The assembly of claim 1, wherein:
   a first scoop of the assembly includes the insert and the passage; and
   the first scoop is one of a plurality of scoops of the assembly.

4. The assembly of claim 3, wherein the plurality of scoops are arranged in the scoop ring body about the rotational axis as a circumferential array of scoops.

5. The assembly of claim 3, wherein the plurality of scoops are axially arranged in the scoop ring body as an axial array of scoops.

6. The assembly of claim 1, wherein:
the insert forms a first portion of the passage along the first circumferential side at the inlet; and
the scoop ring body forms a second portion of the passage along the first circumferential side between the first portion and the outlet.

7. The assembly of claim 1, wherein the insert forms an entire longitudinal length of the passage along the first circumferential side.

8. The assembly of claim 1, wherein:
the insert includes an inner surface and an outer surface; and
the inner surface intersects the outer surface at the cutting edge, the passage at the first circumferential side is at least partially formed by the inner surface, and the inner surface is curved.

9. The assembly of claim 1, wherein the insert is welded or brazed to the scoop ring body.

10. The assembly of claim 9, wherein:
the insert includes a leading end and a trailing end opposite the leading end, the cutting edge at the leading end; and
the insert is welded or brazed to the scoop ring body at the trailing end.

11. The assembly of claim 10, wherein:
the scoop ring body includes a recess on the outer radial side; and
the insert includes an alignment tab, the alignment tab is located at the trailing end, and the alignment tab is positioned within the recess.

12. The assembly of claim 1, wherein:
the scoop ring body extends axially between a first axial end and a second axial end;
the scoop ring body includes an axial slot extending through at least an axial portion of the scoop ring body between the first axial end and the second axial end; and
the insert is positioned within the axial slot.

13. An assembly for rotational equipment, the assembly comprising:
an engine static structure;
a rotatable base structure configured to rotate about a rotational axis relative to the engine static structure;
a scoop ring mounted to the rotatable base structure, the scoop ring configured with a passage and including a scoop ring body and an insert, the passage extending through the scoop ring from an inlet at an outer radial side of the scoop ring to an outlet at an inner radial side of the scoop ring, the passage partially formed by the insert, the scoop ring body comprising a body material, and the insert comprising an insert material which is different than the body material; and
a lubricant injector positioned radially outside of the scoop ring, the lubricant injector configured to direct lubricant against the scoop ring at the outer radial side.

14. The assembly of claim 13, wherein the rotatable base structure includes a shaft and a bearing, the bearing configured to rotatably support the shaft, the bearing including an inner race fixedly mounted to the shaft; and the scoop ring body is mounted to and axially adjacent the inner race.

15. The assembly of claim 13, wherein the insert includes a cutting edge, and the insert is positioned so that the cutting edge is configured to pass through the lubricant stream as the scoop ring body rotates about the rotational axis.

16. The assembly of claim 13, wherein the insert material comprises tungsten carbide.

17. The assembly of claim 13, wherein:
a first scoop of the scoop ring includes the insert and the passage; and
the first scoop is one of a plurality of scoops of the scoop ring.

18. A method for directing lubricant to a rotatable base structure of a gas turbine engine, the method comprising:
directing a lubricant stream of the lubricant from a lubricant injector toward a scoop ring, the scoop ring including a scoop ring body and an insert, the scoop ring body comprising a body material, the insert comprising an insert material, the insert material different than the body material, the scoop ring including a passage through the scoop ring body, the scoop ring body and the insert forming the passage;
rotating the scoop ring such that a cutting edge of the insert passes through the lubricant stream and the insert directs at least some of the lubricant from the lubricant stream into the passage; and
directing the lubricant through the passage to the rotatable base structure.

19. The method of claim 18, wherein the passage extends through the scoop ring body from an inlet to an outlet, and the cutting edge is positioned at the inlet.

20. The method of claim 19, wherein directing the lubricant through the passage includes directing the lubricant along an inner surface of the insert through at least a portion of the passage.

* * * * *